US008441896B2

(12) United States Patent
Wang et al.

(10) Patent No.: US 8,441,896 B2
(45) Date of Patent: *May 14, 2013

(54) ENERGY ASSISTED MAGNETIC RECORDING HEAD HAVING LASER INTEGRATED MOUNTED TO SLIDER

(75) Inventors: Lei Wang, Fremont, CA (US); Shing Lee, Fremont, CA (US); Wentao Yan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 12/824,080

(22) Filed: Jun. 25, 2010

(65) Prior Publication Data

US 2011/0317527 A1    Dec. 29, 2011

(51) Int. Cl.
*G11B 11/00*    (2006.01)
(52) U.S. Cl.
USPC .................................. 369/13.33; 369/13.13
(58) Field of Classification Search ............... 369/13.33, 369/13.13, 13.32, 13.02, 112.09, 112.14, 369/112.21, 112.27, 300; 360/59; 385/129, 385/31, 88–94; 29/603.07–603.27; 250/201.3, 250/201.5
See application file for complete search history.

(56) References Cited

U.S. PATENT DOCUMENTS

| | | | |
|---|---|---|---|
| 6,795,630 B2 | 9/2004 | Challener et al. | |
| 6,850,475 B1 | 2/2005 | Heanue et al. | |
| 7,272,079 B2 | 9/2007 | Challener | |
| 7,365,941 B2 | 4/2008 | Poon et al. | |
| 7,412,143 B2 | 8/2008 | Rottmayer et al. | |
| 7,521,137 B2 | 4/2009 | Hohlfeld | |
| 7,609,480 B2 | 10/2009 | Shukh | |
| 7,796,353 B2 | 9/2010 | Schabes et al. | |
| 8,012,804 B1 * | 9/2011 | Wang et al. | 438/110 |
| 8,024,748 B1 * | 9/2011 | Moravec et al. | 720/659 |
| 8,116,171 B1 | 2/2012 | Lee | |
| 8,125,856 B1 | 2/2012 | Li et al. | |
| 8,134,794 B1 * | 3/2012 | Wang | 369/13.33 |
| 8,194,512 B2 | 6/2012 | Stipe | |
| 8,248,896 B1 | 8/2012 | Yuan et al. | |
| 2004/0001394 A1 | 1/2004 | Challener et al. | |
| 2005/0030883 A1 | 2/2005 | Hesselink et al. | |
| 2005/0031278 A1 | 2/2005 | Shi et al. | |
| 2005/0041950 A1 | 2/2005 | Rottmayer et al. | |
| 2005/0208768 A1 | 9/2005 | Finlay et al. | |
| 2005/0226636 A1 | 10/2005 | Hiramatsu et al. | |
| 2006/0119983 A1 | 6/2006 | Rausch et al. | |
| 2006/0232869 A1 | 10/2006 | Itagi | |
| 2007/0036040 A1 | 2/2007 | Milhalcea | |
| 2007/0297082 A1 | 12/2007 | Peng et al. | |
| 2008/0002298 A1 | 1/2008 | Sluzewski | |
| 2008/0170319 A1 | 7/2008 | Seigler | |

(Continued)

*Primary Examiner* — Tan X Dinh

(57) ABSTRACT

A method and system for providing energy assisted magnetic recording (EAMR) heads are described. The method and system include providing a substrate, at least one EAMR transducer, an overcoat layer and at least one laser. The substrate has a leading edge and a substrate trailing edge. The EAMR transducer(s) reside in a device layer and on the substrate trailing edge. The overcoat layer includes a plurality of contacts. The device layer is between the overcoat layer and the substrate trailing edge. The laser(s) provide energy to the EAMR transducer. The overcoat layer is between the substrate trailing edge and the laser(s). The laser(s) are electrically coupled to at least a first portion of the contacts. The contacts provide thermal connection through the overcoat layer and the device layer. At least a second portion of the contacts is electrically insulated from the substrate.

16 Claims, 11 Drawing Sheets

U.S. PATENT DOCUMENTS

| | | |
|---|---|---|
| 2008/0218891 A1 | 9/2008 | Gubbins et al. |
| 2008/0239541 A1* | 10/2008 | Shimazawa et al. ........ 369/13.33 |
| 2009/0310459 A1 | 12/2009 | Gage et al. |
| 2010/0061018 A1 | 3/2010 | Albrecht et al. |
| 2010/0123965 A1 | 5/2010 | Lee et al. |
| 2010/0328807 A1* | 12/2010 | Snyder et al. .............. 369/13.33 |
| 2011/0026156 A1* | 2/2011 | Shimazawa et al. ........ 369/13.33 |
| 2011/0096435 A1* | 4/2011 | Sasaki et al. ................ 369/13.33 |
| 2012/0044790 A1* | 2/2012 | Shimazawa et al. ........ 369/13.32 |
| 2012/0073120 A1* | 3/2012 | Shimazawa et al. ........ 29/603.07 |
| 2012/0090162 A1* | 4/2012 | Shimazawa et al. ........ 29/603.01 |
| 2012/0139566 A1* | 6/2012 | Shimazawa et al. ........ 369/13.33 |

* cited by examiner

ENERGY ASSISTED MAGNETIC RECORDING HEAD HAVING LASER INTEGRATED MOUNTED TO SLIDER

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Although termed "edges", the leading edge 22 and trailing edge 26 are surfaces of the slider 20. The leading edge 22 and trailing edge 26 are so termed because of the direction the conventional media 12 travels with respect to the EAMR transducer 28. Other components that may be part of the conventional EAMR disk drive 10 are not shown. The conventional slider 20 is typically attached to the suspension at its back side 24. A conventional EAMR transducer 28 is coupled with the slider 20.

The laser diode 30 is coupled in proximity to the EAMR transducer 28 on the trailing edge 26 of the slider 20. Light from the conventional laser diode 30 is provided substantially along the optic axis 32 of the conventional laser diode 30 to the trailing edge 26 of the slider 20. More specifically, light from the laser diode 30 is provided to a grating (not shown) of conventional EAMR transducer 28. The light from the laser diode 30 coupled into the grating is then provided to a waveguide (not shown). The waveguide directs the light toward the conventional media 12, heating a small region of the conventional media 12. The conventional EAMR transducer 28 magnetically writes to the conventional media 12 in the region the conventional media 12 is heated.

Although the conventional EAMR disk drive 10 may function, improvements are desired. More specifically, the laser diode 30 may be desired to be physically integrated onto the conventional slider 20. However, the back side 24 and trailing edge 26 of the slider 20 are generally crowded even without the addition of the laser 30. In addition, the fly height of the transducer 28 with respect to the media 12 is described to be kept substantially unaffected by inclusion of the laser diode 30. Moreover, the heat generated by the laser diode 30 is also desired to be dissipated. Failure to adequately dissipate heat generated by the laser diode 30 may adversely affect performance and reliability of the laser diode 30, as well as other components of the EAMR disk drive 10.

Accordingly, improved methods and systems for integrating the laser within the EAMR disk drive are desired.

BRIEF SUMMARY OF THE INVENTION

A method and system for providing energy assisted magnetic recording (EAMR) heads are described. The method and system include providing a substrate, at least one EAMR transducer, an overcoat layer and at least one laser. The substrate has a leading edge and a substrate trailing edge. The EAMR transducer(s) reside in a device layer and on the substrate trailing edge. The overcoat layer includes a plurality of contacts. The device layer is between the overcoat layer and the substrate trailing edge. The laser(s) provide energy to the EAMR transducer. The overcoat layer is between the substrate trailing edge and the laser(s). The laser(s) are electrically coupled to at least a first portion of the plurality of contacts. The contacts provide thermal connection through the overcoat layer and the device layer. At least a second portion of the plurality of contact is electrically insulated from the substrate.

DETAILED DESCRIPTION OF EMBODIMENTS OF THE INVENTION

Figure 1:
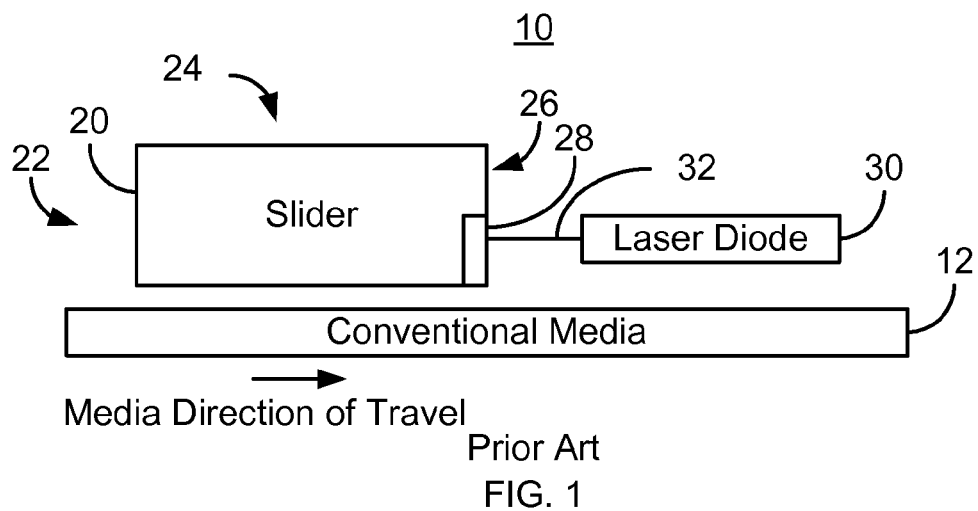
FIG. 1 is a diagram depicting a portion of a conventional energy assisted magnetic recording disk drive.
Figure 2:
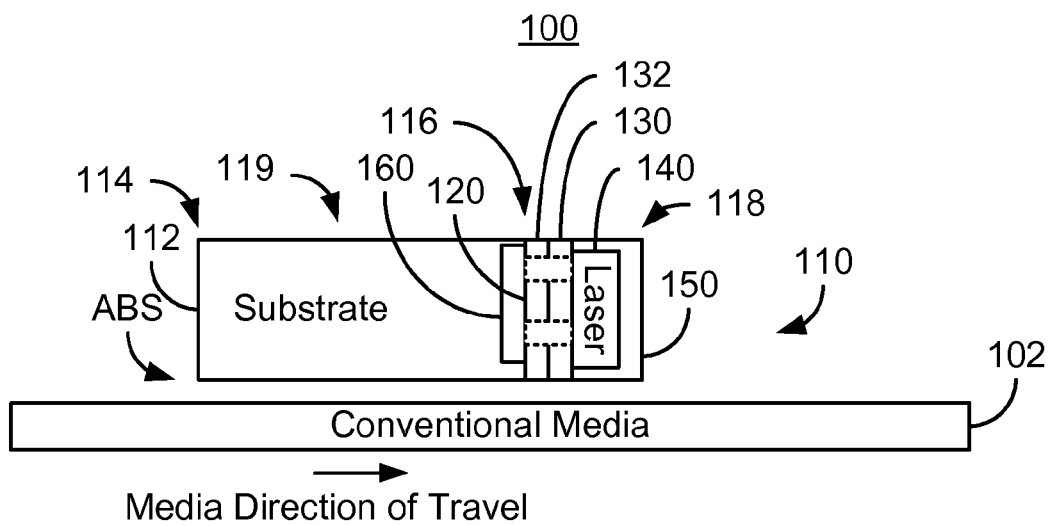
FIG. 2 is a diagram depicting an exemplary embodiment of an EAMR disk drive.
Figure 3:
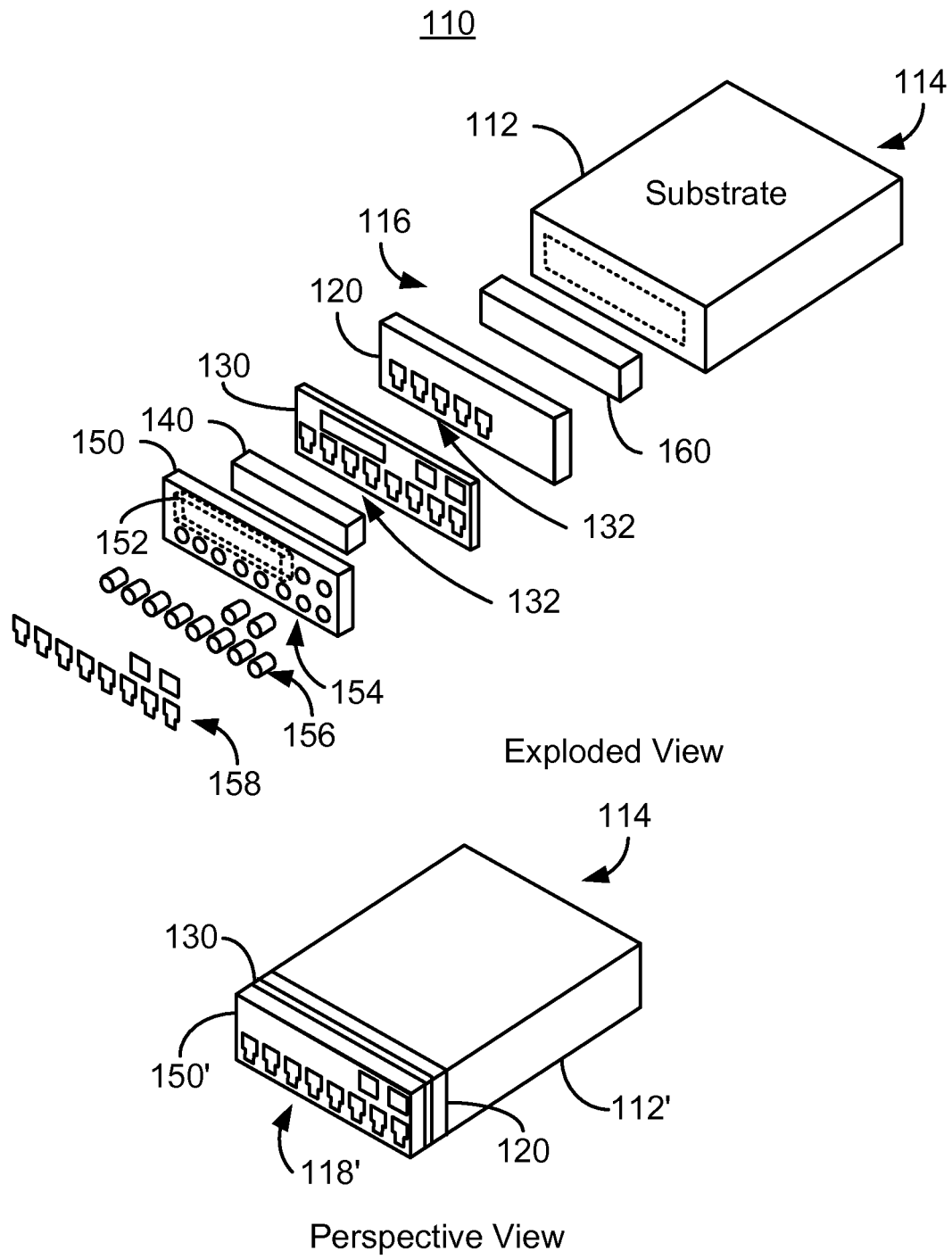
FIG. 3 is a diagram depicting an exemplary embodiment of an EAMR head.

FIG. 2 depicts an exemplary embodiment of an EAMR disk drive 100 including an EAMR head 110. FIG. 3 depicts an EAMR head 110 used in the disk drive 100. FIG. 2 is a side view of the disk drive 100. FIG. 3 depicts exploded and perspective views of the EAMR head 110. For clarity, FIGS. 2-3 are not to scale. For simplicity not all portions of the EAMR disk drive 100 and EAMR head 110 are shown. In addition, although the disk drive 100 and EAMR head 110 are depicted in the context of particular components other and/or different components may be used. Further, the arrangement of components may vary in different embodiments.

The EAMR disk drive 100 includes a media 102 and an EAMR head 110, also termed a slider. The EAMR head 110 includes a substrate 112, a device layer 120, an overcoat layer 130, a laser 140, an optional capping layer 150, and optional heat spreader 160. The head 110 has a slider leading edge 114 and a trailing edge 118. The substrate 112 has a leading edge 114 and a substrate trailing edge 116. Although termed "edges", the edges 114, 116, and 118 are surfaces. The device layer 120 includes at least an EAMR transducer (not shown in FIG. 2) and may include a read transducer (not shown). The read transducer may be included if the EAMR head 110 is a merged head. In some embodiments, the device layer 120 is on the order of twelve microns thick, the overcoat layer 130 is on the order of fifteen microns thick, and the substrate 112 is eight hundred fifty microns thick. The capping layer 150 is shown as including a cavity 152 configured for the laser 140, vias 154, contacts 156 for the vias and pads 158. The laser 140 may be a laser diode.

The overcoat layer 130 includes contacts 132. At least some of the contacts 132 provide thermal conductivity through the overcoat layer 130 and the device layer 120. In some embodiments, the contacts 132 thermally couple the laser 140 with the substrate 112. Thus, the contacts 132 may have a high thermal conductivity with respect to the surrounding materials. For example, the contacts 132 may primarily include a high thermal conductivity material, such as Cu. In embodiments having the heat spreader 160, the contacts 132 are thermally coupled with the heat spreader 160. At least some of the contacts 132 electrically insulate the laser 140 from the substrate 112. Stated differently, the laser 140 is not electrically coupled to the substrate 112 through all of the contacts 132. For example, in some embodiments, one or more ground contacts electrically and thermally connect the laser 140 with the substrate 112. However, remaining contacts 132 electrically connect the laser 140 and/or other components to the desired portions of the device layer 120, but not to the substrate 112. These contacts still thermally connect the laser 140 with the substrate 112. The contacts 132 may also be increased in width such that the contacts 132 occupy a larger footprint. Thus, a larger portion of each of the contacts 132 may be in physical contact with the laser 140.

In operation, the laser 140 provides light to the EAMR transducer (not shown) in the device layer 120. In some embodiments, a grating (not shown) is used to couple the light into the transducer. The laser light is directed toward the ABS, for example by a waveguide (not shown). The light may be focused onto the media 102, for example using a near-field transducer (NFT, not shown). The region of the media is thus heated. A pole, which may be energized by a coil, is then used to magnetically write to the region of the media.

The thermal management of the EAMR disk drive 100 may be improved. In particular, the contacts 132 have a high thermal conductivity. Thus, heat generated by the laser 140 may be conducted from the laser 140 to the substrate 112, which has an improved ability to dissipate heat. The heat spreader 160 may also be used to carry heat to the ABS. Thus, the EAMR head 110 may be better able to manage heat and thus have improved reliability and performance. Further, already existing electrical contacts 132 are used for heat dissipation. Thus, the improved thermal management may be achieved without complicating fabrication or occupying substantially more real estate within the overcoat layer 130.

Figure 4:
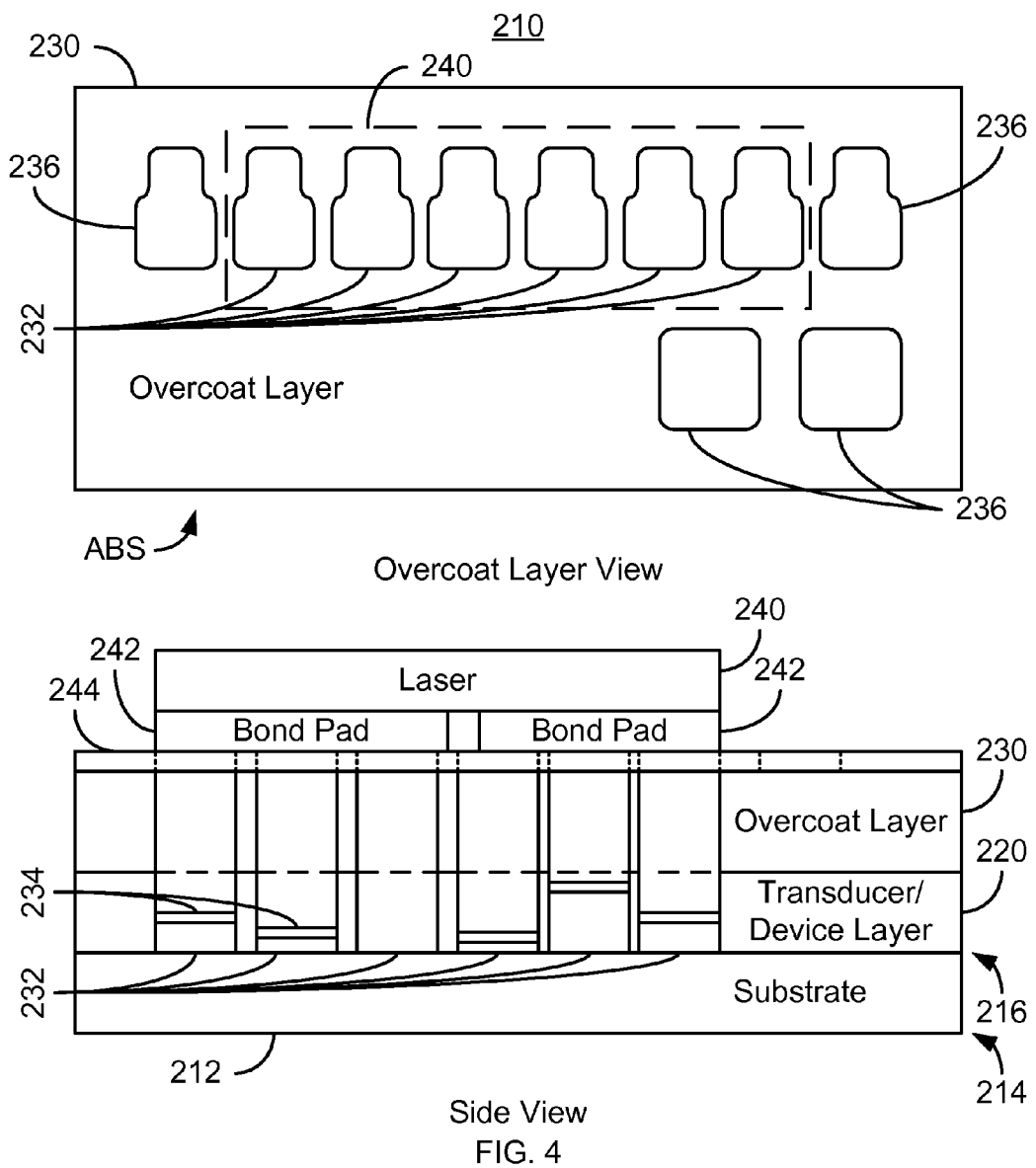
FIG. 4 is a diagram depicting another exemplary embodiment of an EAMR head.

FIG. 4 is a diagram depicting an exemplary embodiment of an EAMR head 210. FIG. 4 depicts side and overcoat layer views of the EAMR head 210. For clarity, FIG. 4 is not to scale. For simplicity not all portions of the EAMR head 210 are shown. In addition, although the EAMR head 210 is depicted in the context of particular components other and/or different components may be used. Further, the arrangement of components may vary in different embodiments. The EAMR head 210 is analogous to the EAMR head 110 and may be used in the disk drive 100. Thus, similar components of the EAMR head 210 have analogous labels. The EAMR head 210 thus includes a substrate 212 having a substrate leading edge 214 and a substrate trailing edge 216, device layer 220, overcoat layer 230 including contacts 232 and laser 240 that correspond to the substrate 112 having the substrate leading edge 114 and the substrate trailing edge 116, the device layer 120, the overcoat layer 130 including contacts 132 and the laser 140, respectively. Also shown are additional contacts 236, bond pads 242 and insulating layer 244.

As can be seen in FIG. 4, the laser 240 is bonded to the EAMR head 210 via bond pads 242, which may be conductive. The bond pads 242 mechanically connect the laser 240 to the head 210. The thin insulating layer 244 may electrically isolate each of the contacts 232 from another contact 232 as well as from the laser 240. However, in other embodiments, only the overcoat layer 230 may be relied upon for insulation and the thin insulating layer 244 omitted. Further, the region of the overcoat layer 230 and device layer 220 around the contacts 232 is insulating, for example, aluminum oxide. Thus, the contacts 232 are electrically insulating from each other unless specifically designed otherwise.

The laser 240 is electrically coupled to at least some of the contacts 232. In the embodiment shown, the laser 240 is electrically connected to all of the contacts 232. In other embodiments, the laser 240 may be coupled to only a portion of the contacts 232. The contacts 232 provide thermal connection through the overcoat layer 230 and the device layer 220 to the substrate 212. In the embodiment shown, one of the contacts 232 both electrically and thermally connects the laser 240 to the substrate 212. However, in other embodiments, multiple ground contacts 232 may both electrically and thermally connect the laser 240 to the substrate 212. The remaining contacts 232 electrically isolate the laser 240 from the substrate 212 but thermally connect the laser 240 to the substrate 212. In some embodiments, the remaining contacts 232 include a thin insulating layer 234, which electrically isolates the top portion of the contacts 232 proximate to the laser 240 from the bottom portion of the contacts 232 proximate to the substrate 212. Thus, the insulating layers 234 are sufficiently thick to provide electrical insulation but sufficiently thin that the thermal connection to the substrate 212 is not broken. Stated differently, the insulating layers 234 are thin enough that heat dissipation is not significantly impeded while providing electrical insulation. Thus, the insulating layers 234 allow thermal connection through the device layer 120 and electrical connection to a portion of the device layer 120. The insulating layers 234 may reside at or below the layer in the device layer 220 to which electrical connection is to be made. In some such embodiments, the electrically conductive portion of the contacts 232 includes one or more materials, such as Cu, Au, their alloys, NiFe, CoFe and/or other materials that have high thermal and electrical conductivity. The insulating layer 234 may include electrically and thermally insulating material(s) such as aluminum oxide or silicon oxide. In other embodiments, the insulating layer 234 may be thermally conductive but electrically insulating. For example, SiC or diamond-like carbon (DLC) might be used. In some embodiments, the portion of the contacts 232 below the insulating layer 234 may have a high thermal conductivity but be electrically insulating. In other embodiments, the portion of the contacts 232 below the insulating layer 234 may have high thermal and electrically conductivities. The contacts 232 function electrically as desired yet still provide a thermal path between the laser 240 and the substrate 212.

The EAMR head 210 functions in an analogous manner to the EAMR head 110. Thus, the thermal management of the EAMR head 210 and the EAMR disk drive 100 in which it may be used may be improved. In particular, the contacts 232 have a high thermal conductivity in addition to the electrically insulating layers 234. Thus, heat generated by the laser 240 may be conducted from the laser 240 to the substrate 212, which has an improved ability to dissipate heat. Thus, the EAMR head 210 may be better able to manage heat and thus have improved reliability and performance. Already existing electrical contacts 232 are used for heat dissipation. Thus, the improved thermal management may be achieved without complicating fabrication or occupying substantially more of the overcoat layer 230.

Figure 5:
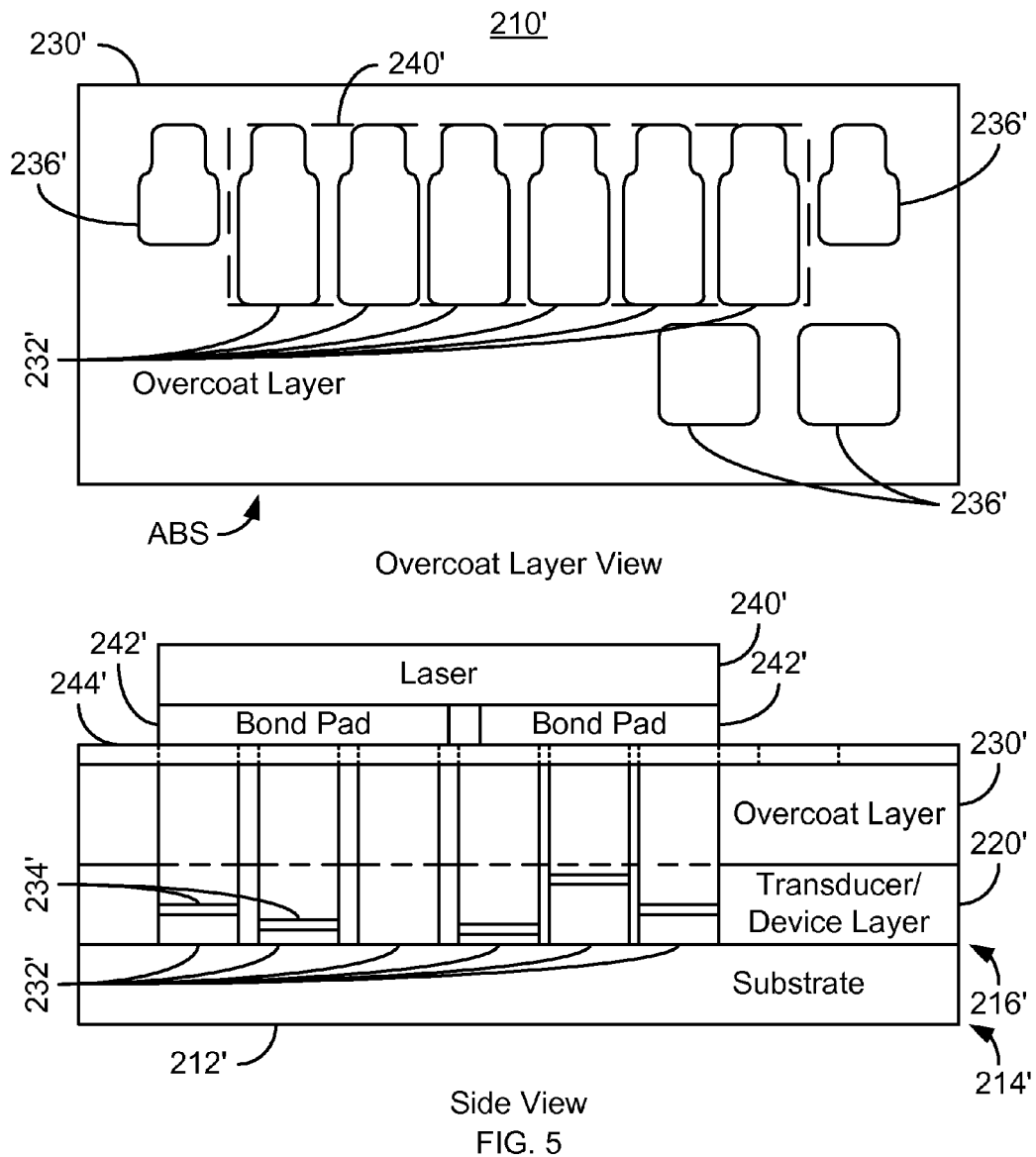
FIG. 5 is a diagram depicting another exemplary embodiment of an EAMR head.

FIG. 5 is a diagram depicting an exemplary embodiment of an EAMR head 210'. FIG. 5 depicts side and overcoat layer views of the EAMR head 210'. For clarity, FIG. 5 is not to scale. For simplicity not all portions of the EAMR head 210' are shown. In addition, although the EAMR head 210' is depicted in the context of particular components other and/or different components may be used. Further, the arrangement of components may vary in different embodiments. The EAMR head 210' is analogous to the EAMR heads 110/210 and may be used in the disk drive 100. Thus, similar components of the EAMR head 210' have analogous labels. The EAMR head 210' thus includes a substrate 212' having a substrate leading edge 214' and a substrate trailing edge 216', device layer 220', overcoat layer 230' including contacts 232', and laser 240' that correspond to the substrate 112/212 having the substrate leading edge 114/214 and the substrate trailing edge 116/216, the device layer 120/220, the overcoat layer 130/230 including contacts 132/232 and the laser 140/240, respectively. Also shown are additional contacts 236', bond pads 242' and insulating layer 244' that are analogous to the contacts 236, bond pads 242, and insulating layer 244, respectively. Further, although one ground contact 232' is shown, the remaining contacts 232' have insulating layers 234' therein. Thus, the contacts 232' are analogous to the contacts 132/232.

In addition, the footprint of the contacts 232' has been increased. As can be seen in the overcoat layer view, the contacts 232' occupy a larger portion of the footprint of the laser 240'. In the embodiment shown, the contacts 232' extend across the footprint of the laser 240' in one direction (from top to bottom in FIG. 5). The contacts 232' are separated in the horizontal direction in FIG. 5. This separation allows the contacts 232' to be electrically isolated from each other. In some embodiments, the separation is on the order of twenty-five microns. In some embodiments, the distance between the contacts 232' in the horizontal direction is at or slightly larger than a minimum separation. The minimum separation is the minimum distance that allows the contacts 232' to be electrically isolated from each other. Increasing the footprint of the contacts 232' increases the amount of thermally conductive material in the EAMR head 210' and the thermal connection between the laser 240' and the contacts 232'.

The EAMR head 210' functions in an analogous manner to the EAMR heads 110/210. Thus, the thermal management of the EAMR head 210' and the EAMR disk drive 100 in which it may be used may be improved. In particular, the contacts 232' have a high thermal conductivity in addition to the insulating layers 234'. Thus, heat generated by the laser 240' may be conducted from the laser 240' to the substrate 212', which has an improved ability to dissipate heat. This conduction of heat may be enhanced by increasing the footprint of the contacts 232'. Thus, the EAMR head 210' may be better able to manage heat and thus have improved reliability and performance. Already existing electrical contacts 232' are used for heat dissipation. Thus, the improved thermal management may be achieved without complicating fabrication or occupying substantially more of the overcoat layer 230'.

Figure 6:
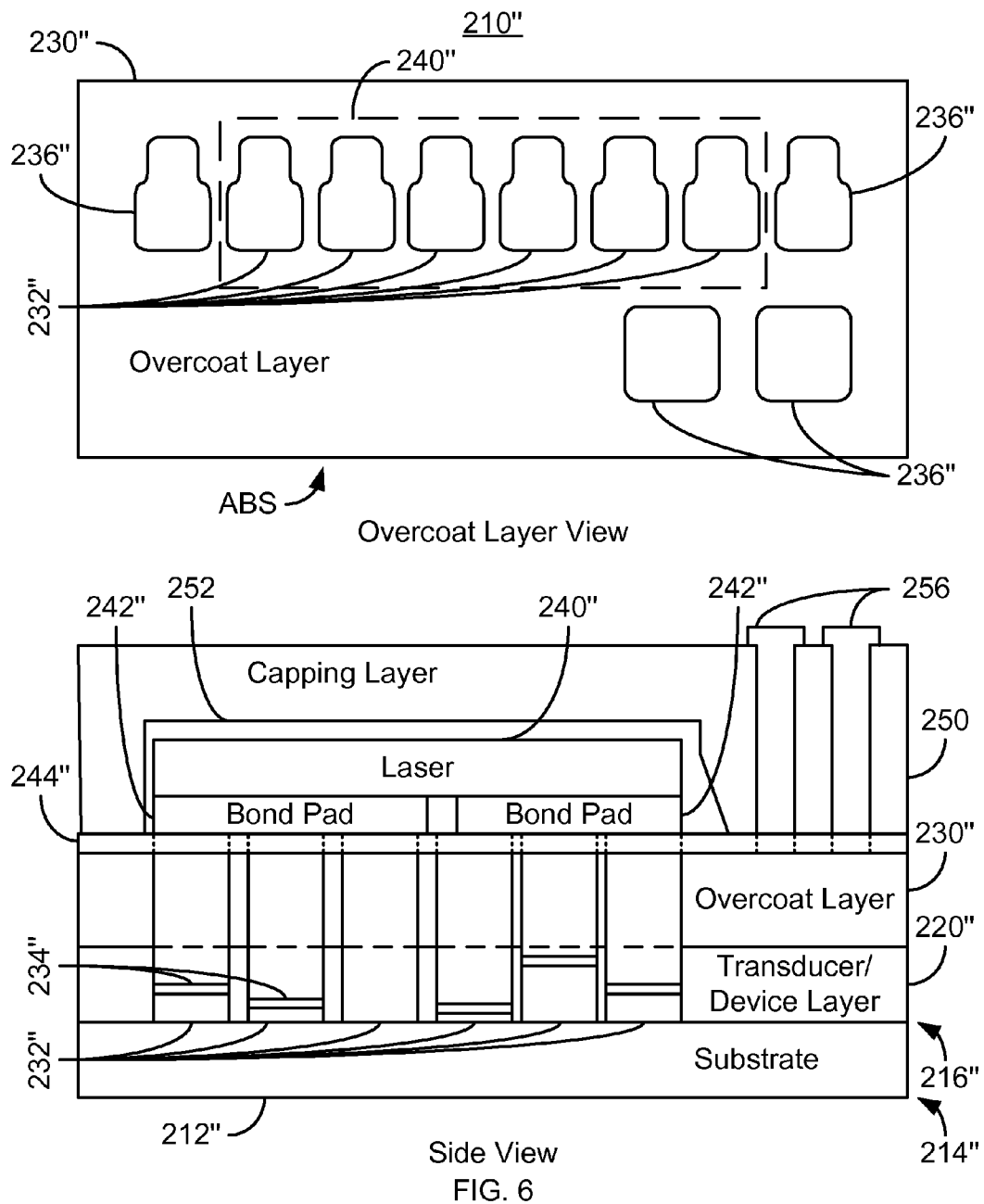
FIG. 6 is a diagram depicting another exemplary embodiment of an EAMR head.

FIG. 6 is a diagram depicting an exemplary embodiment of an EAMR head 210". FIG. 6 depicts side and overcoat layer views of the EAMR head 210". For clarity, FIG. 6 is not to scale. For simplicity not all portions of the EAMR head 210" are shown. In addition, although the EAMR head 210" is depicted in the context of particular components other and/or different components may be used. Further, the arrangement of components may vary in different embodiments. The EAMR head 210" is analogous to the EAMR heads 110/210/210' and may be used in the disk drive 100. Thus, similar components of the EAMR head 210" have analogous labels. The EAMR head 210" thus includes a substrate 212" having a substrate leading edge 214" and a substrate trailing edge 216", device layer 220", overcoat layer 230" including contacts 232", and laser 240" that correspond to the substrate 112/212/212' having the substrate leading edge 114/214/214' and the substrate trailing edge 116/216/218', the device layer 120/220/220', the overcoat layer 130/230'/230 including contacts 132/232/232' and the laser 140/240/240', respectively. Also shown are additional contacts 236", bond pads 242" and insulating layer 244" that are analogous to the contacts 236/236', bond pads 242/242', and insulating layer 244/244', respectively. Further, one ground contact 232" is shown. The remaining contacts 232" have insulating layers 234" therein. Thus, the contacts 232' are analogous to the contacts 132/232/232'. Although shown as having a smaller footprint, analogous to the footprint of the contacts 232, the contacts 232" might have a larger footprint. For example, the contacts 232" may be analogous to the contacts 232'.

In addition, the capping layer 250 is shown. The capping layer 250 is analogous to the capping layer 150 depicted in FIGS. 2-3. Thus, the capping layer 250 includes a cavity 252 analogous to the cavity 150 and contacts 256 analogous to the contacts/pads 156/158. Although not separately shown, the cavity 252 may have a reflective surface to redirect light from the laser 240". The cavity 252 encloses the laser 240". As the capping layer 250 may be sealed to the overcoat layer 230", the laser 240" may be sealed in the cavity 252.

The EAMR head 210" functions in an analogous manner to the EAMR heads 110/210/210'. Thus, the thermal management of the EAMR head 210" and the EAMR disk drive 100 in which it may be used may be improved. In particular, the contacts 232" provide a high conductivity thermal path between the laser 240" and the substrate 212" as well as the desired electrical function. Heat generated by the laser 240" may be conducted from the laser 240" to the substrate 212", which has an improved ability to dissipate heat. Thus, the EAMR head 210" may be better able to manage heat and thus have improved reliability and performance. Already existing electrical contacts 232" are used for heat dissipation. Thus, the improved thermal management may be achieved without complicating fabrication or occupying substantially more of the overcoat layer 230". Further, the laser 240" is enclosed in the cavity 252 of the capping layer 250. Thus, the laser 240" may be protected from damage during manufacturing and use.

Figure 7:
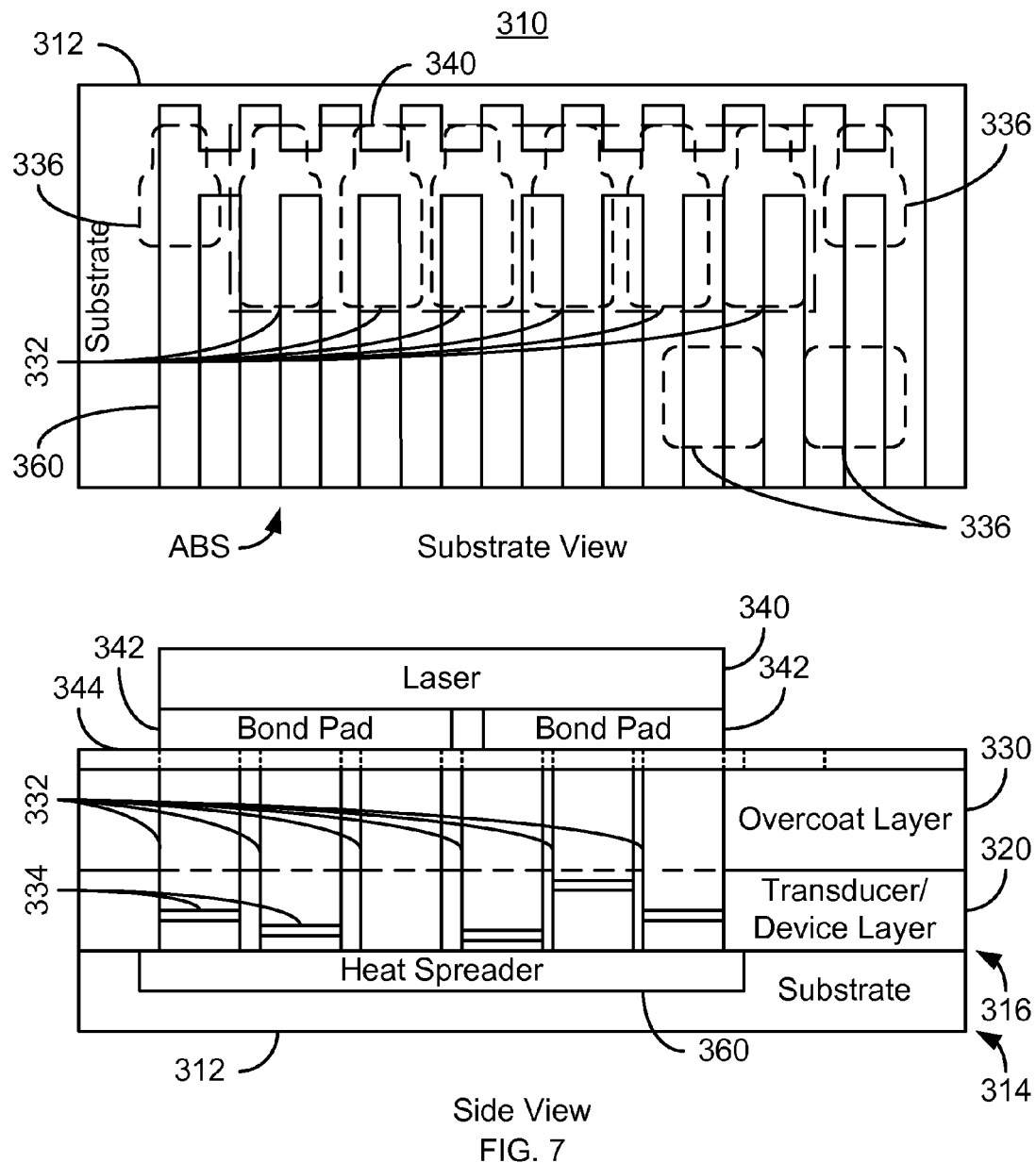
FIG. 7 is a diagram depicting another exemplary embodiment of an EAMR head.

FIG. 7 is a diagram depicting an exemplary embodiment of an EAMR head 310. FIG. 7 depicts side and substrate views of the EAMR head 310. For clarity, FIG. 7 is not to scale. For simplicity not all portions of the EAMR head 310 are shown. In addition, although the EAMR head 310 is depicted in the context of particular components other and/or different components may be used. Further, the arrangement of components may vary in different embodiments. The EAMR head 310 is analogous to the EAMR heads 110/210/210'/210" and may be used in the disk drive 100. Thus, similar components of the EAMR head 310 have analogous labels. The EAMR head 310 thus includes a substrate 312 having a substrate leading edge 314 and a substrate trailing edge 316, device layer 320, overcoat layer 330 including contacts 332 and laser 340 that correspond to the substrate 112/212/212'/212" having the substrate leading edge 114/214/214'/214" and the substrate trailing edge 116/216/216'/216", the device layer 120/220/220'/220", the overcoat layer 130/230/230'/230" including contacts 132/232/232'/232" and the laser 140/240/240'/240", respectively. Also shown are additional contacts 336, bond pads 342 and insulating layer 344 that are analogous to the contacts 236/236'/236", bond pads 242/242'/242" and insulating layer 244/244'/244". The structure and function of the components 312, 314, 316, 320, 330, 332, 334, 336, 340, 342, and 344 are analogous to the structure and function of the components 112/212/212'/212', 114/214/214'/

214", 116/216/216'/216", 120/220/220'/220", 130/230/230'/ 230", 132/232/232'/232", 234/234'/234", 136/236/236'/236", 140/240/240'/240", and 142/242/242'/242", respectively. Although not shown, the head 310 may include a capping layer analogous to the capping layers 150 and 250.

The head 310 also includes a heat spreader 360. The heat spreader 360 includes a high thermal conductivity material, such as Cu, Ag, Au, their alloys, NiFe, and/or CoFe. In some embodiments, the heat spreader 360 may include insulating materials, such as SiC and/or DLC. The heat spreader 360 may also include a mixture of high thermal conductivity materials, such as diamond particles in a Cu matrix. The heat spreader 360 is thermally coupled with at least some of the contacts 332. In the embodiment shown, the heat spreader 360 is in contact with and thus thermally coupled with all of the contacts 332. However, in other embodiments, the heat spreader 360 might be thermally coupled with only some of the contacts 332. In the embodiment shown, the heat spreader 360 includes a plurality of bars. However, in other embodiments, the heat spreader 360 may have another configuration. Further, a portion of the heat spreader 360 occupies part of the ABS. In other embodiments, the heat spreader 360 may be recessed from the ABS. For example, it may be desirable to recess the heat spreader 360 from the ABS to prevent corrosion of the heat spreader 360. However, in some such embodiments, the heat spreader 360 is still thermally connected with the ABS. Finally, the heat spreader 360 is shown as being recessed in the substrate 312. However, in other embodiments, the heat spreader 360 may reside on the substrate trailing edge 316. In such embodiments, the heat spreader 360 may have insulating layers around it.

The EAMR head 310 functions in an analogous manner to the EAMR heads 110/210/210'/210". Thus, the thermal management of the EAMR head 310 and the EAMR disk drive 100 in which it may be used may be improved. In particular, the contacts 332 provide a high conductivity thermal path between the laser 340 and the substrate 312 as well as the desired electrical function. Heat generated by the laser 340 may be conducted from the laser 340 to the substrate 312, which has an improved ability to dissipate heat. Thus, the EAMR head 310 may be better able to manage heat and thus have improved reliability and performance. Already existing electrical contacts 332 are used for heat dissipation. Thus, the improved thermal management may be achieved without complicating fabrication or occupying substantially more of the overcoat layer 330. Further, the head 310 includes heat spreader 360. The heat spreader 360 may further conduct heat from the laser 340 across the substrate 312. In embodiments in which the heat spreader 360 occupies a portion of the ABS or is only slightly recessed from the ABS, the heat spreader 360 also conducts heat to the ABS. The ABS may provide an improved mechanism for dissipation of the heat from the laser 340. In addition, because the heat spreader 360 is configured as a series of bars, thermal expansion of the region of the substrate 312 may be mitigated. Thus, thermal management of the EAMR head 310 may be further improved. Performance and reliability of the EAMR head 310 may thus be enhanced.

Figure 8:
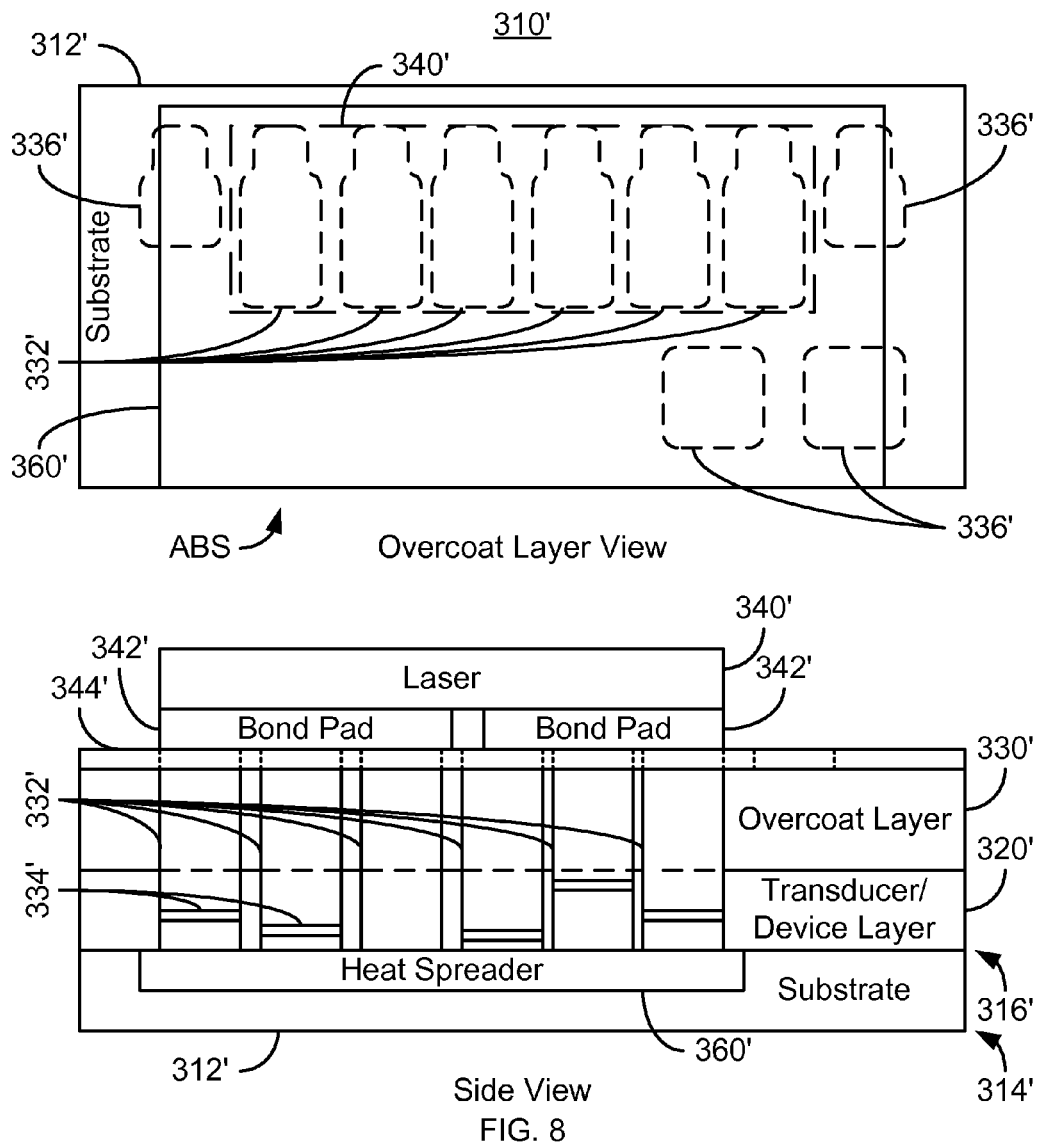
FIG. 8 is a diagram depicting another exemplary embodiment of an EAMR head.

FIG. 8 is a diagram depicting an exemplary embodiment of an EAMR head 310'. FIG. 8 depicts side and substrate views of the EAMR head 310'. For clarity, FIG. 8 is not to scale. For simplicity not all portions of the EAMR head 310' are shown. In addition, although the EAMR head 310' is depicted in the context of particular components other and/or different components may be used. Further, the arrangement of components may vary in different embodiments. The EAMR head 310' is analogous to the EAMR heads 110/210/210'/210"/310 and may be used in the disk drive 100. Thus, similar components of the EAMR head 310' have analogous labels. The EAMR head 310' thus includes a substrate 312' having a substrate leading edge 314' and a substrate trailing edge 316', device layer 320', overcoat layer 330' including contacts 332' and laser 340' that correspond to the substrate 312 having the substrate leading edge 314 and the substrate trailing edge 316, the device layer 320, the overcoat layer 330 including contacts 332 and the laser 340, respectively. Also shown are additional contacts 336', bond pads 342' and insulating layer 344' that are analogous to the contacts 336, bond pads 342 and insulating layer 344. The structure and function of the components 312', 314', 316', 320', 330', 332', 336', 340', 342', and 344' are analogous to the structure and function of components 312, 314, 316, 320, 330, 332, 334, 336, 340, 342, and 344, respectively. Although not shown, the head 310' may include a capping layer analogous to the capping layers 150 and 250.

The head 310' also includes a heat spreader 360'. The heat spreader 360' is analogous to the heat spreader 360. However, the heat spreader 360' is configured as a rectangular slab. The heat spreader 360' includes a high thermal conductivity material, such as Cu, Ag, Au, their alloys, NiFe, and/or CoFe. In some embodiments, the heat spreader 360' may include insulating materials, such as SiC and/or DLC. The heat spreader 360' may also include a mixture of materials, such as diamond particles in a Cu matrix. The heat spreader 360' is thermally coupled with at least some of the contacts 332'. In the embodiment shown, the heat spreader 360' is in contact with and thus thermally coupled with all of the contacts 332'. However, in other embodiments, the heat spreader 360' might be thermally coupled with only some of the contacts 332'. In the embodiment shown, the heat spreader 360' is a conductive slab. However, in other embodiments, the heat spreader 360' may have another configuration. Further, a portion of the heat spreader 360' occupies part of the ABS. In other embodiments, the heat spreader 360' may be recessed from the ABS. For example, it may be desirable to recess the heat spreader 360' from the ABS to prevent corrosion of the heat spreader 360'. However, in some such embodiments, the heat spreader 360' is still thermally connected with the ABS. However, in other embodiments, the heat spreader 360' may reside on the substrate trailing edge 316'. In such embodiments, the heat spreader 360' may have insulating layers around it.

The EAMR head 310' functions in an analogous manner to the EAMR heads 110/210/210'/210"/310. Thus, the thermal management of the EAMR head 310' and the EAMR disk drive 100 in which it may be used may be improved through the use of the contacts 332'. Thus, the EAMR head 310' may be better able to manage heat and have improved reliability and performance without complicating fabrication or occupying substantially more of the overcoat layer 330'. Further, the head 310' includes heat spreader 360'. The heat spreader 360' may further conduct heat from the laser 340' across the substrate 312'. In embodiments in which the heat spreader 360' occupies a portion of the ABS or is only slightly recessed from the ABS, the heat spreader 360' also conducts heat to the ABS. The ABS may provide an improve mechanism for dissipation of the heat from the laser 340'. Thus, thermal management of the EAMR head 310' may be further improved. Performance and reliability of the EAMR head 310' may thus be enhanced.

Figure 9:
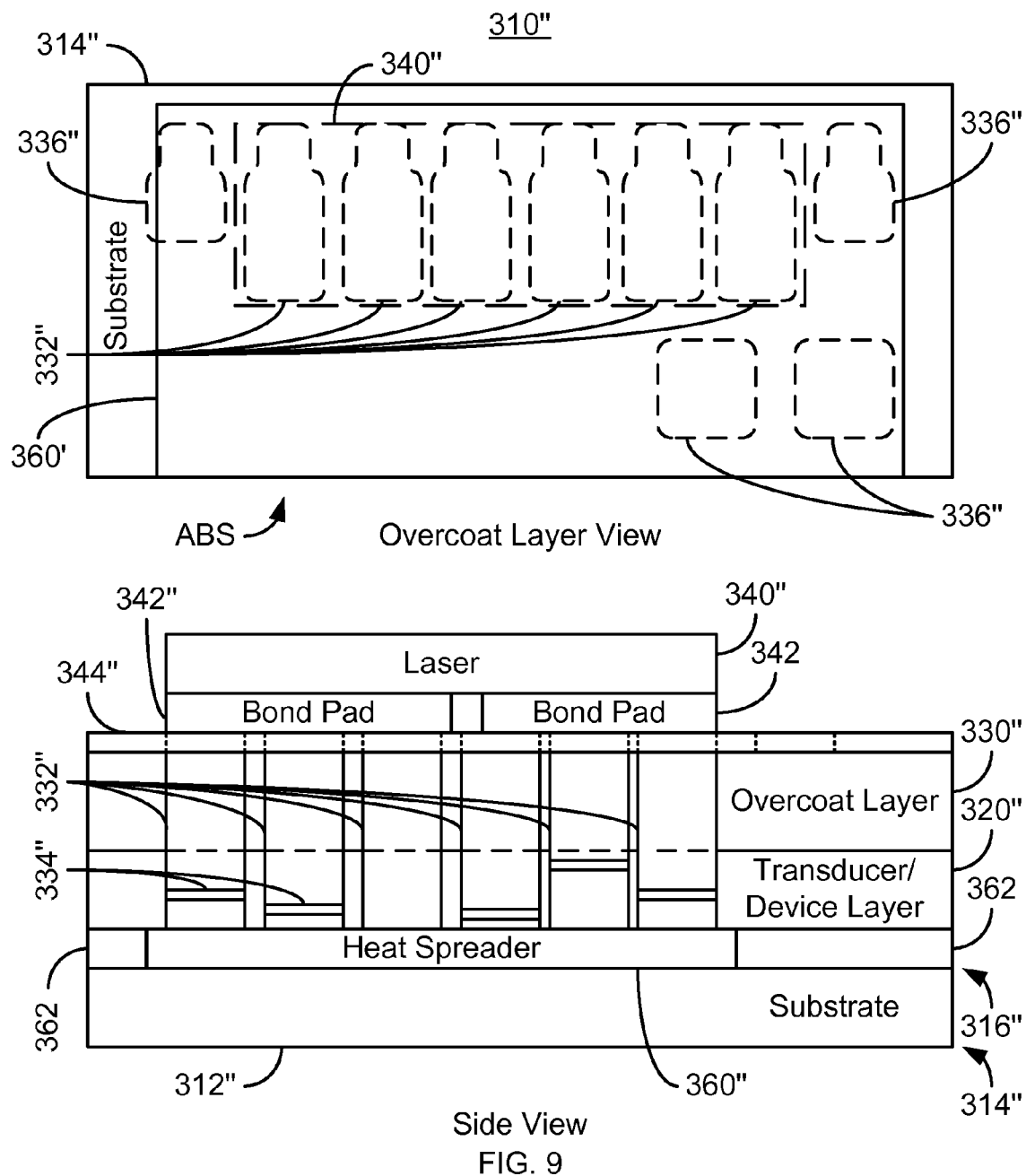
FIG. 9 is a diagram depicting another exemplary embodiment of an EAMR head.

FIG. 9 is a diagram depicting an exemplary embodiment of an EAMR head 310". FIG. 9 depicts side and substrate views of the EAMR head 310". For clarity, FIG. 9 is not to scale. For simplicity not all portions of the EAMR head 310" are shown. In addition, although the EAMR head 310" is depicted in the context of particular components other and/or different components may be used. Further, the arrangement of components may vary in different embodiments. The EAMR head 310" is analogous to the EAMR heads 110/210/210'/210"/310/310' and may be used in the disk drive 100. Thus, similar components of the EAMR head 310" have analogous labels. The EAMR head 310" thus includes a substrate 312" having a substrate leading edge 314" and a substrate trailing edge 316", device layer 320", overcoat layer 330" including contacts 332" and laser 340" that correspond to the substrate 312/312' having the substrate leading edge 314/314' and the substrate trailing edge 316/316', the device layer 320/320', the overcoat layer 330/330' including contacts 332/332' and the laser 340/340', respectively. Also shown are additional contacts 336", bond pads 342" and insulating layer 344" that are analogous to the contacts 336/336', bond pads 342/342' and insulating layer 344/344'. The structure and function of the components 312", 314", 316", 320", 330", 332", 334", 336", 340", 342", and 344" are analogous to the structure and function of components 312/312', 314/314', 316/316', 320/320', 330/330', 332/332', 334/334', 336/336', 340/340', 342/342', and 344/344', respectively. Although not shown, the head 310" may include a capping layer analogous to the capping layers 150 and 250.

The head 310" also includes a heat spreader 360" analogous to the heat spreaders 360 and 360'. More specifically, the heat spreader 360" is analogous to the heat spreader 360' in that it has a slab configuration. The structure and function of the heat spreader 360" is thus analogous to the structure and function of the heat spreaders 360 and 360'. However, the heat spreader 360" resides on the substrate trailing edge 316". Thus, insulation 362 is provided around the heat spreader 360".

The EAMR head 310" functions in an analogous manner to the EAMR heads 110/210/210'/210"/310/310'. Thus, the thermal management of the EAMR head 310" and the EAMR disk drive 100 in which it may be used may be improved through the use of the contacts 332". Thus, the EAMR head 310' may be better able to manage heat without complicating fabrication or occupying substantially more of the overcoat layer 330'. Further, the head 310" includes heat spreader 360". The heat spreader 360" may further conduct heat from the laser 340" across the substrate 312". In embodiments in which the heat spreader 360" occupies a portion of the ABS or is only slightly recessed from the ABS, the heat spreader 360" also conducts heat to the ABS. The ABS may provide an improve mechanism for dissipation of the heat from the laser 340". Thus, thermal management of the EAMR head 310" may be further improved. Performance and reliability of the EAMR head 310" may thus be enhanced.

Figure 10:
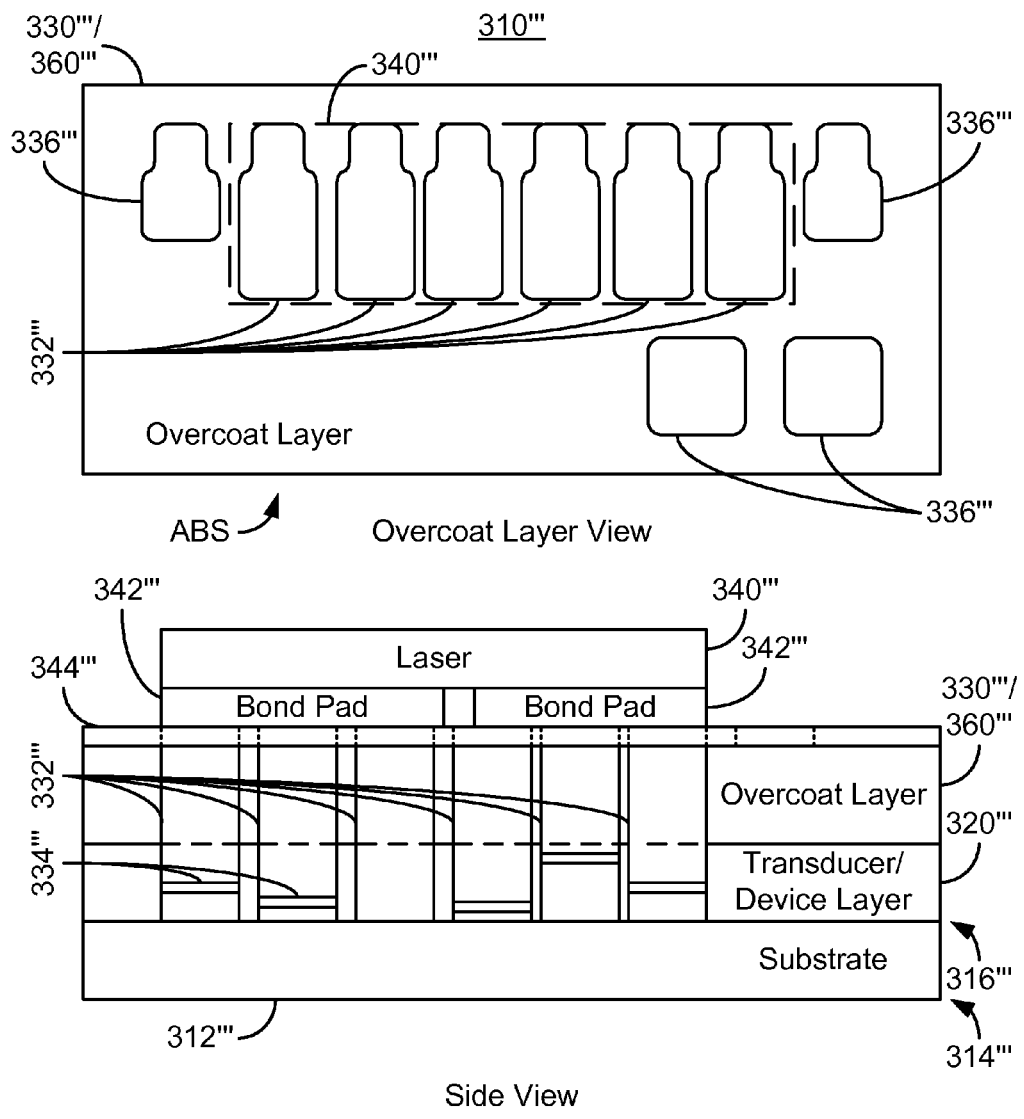
FIG. 10 is a diagram depicting another exemplary embodiment of an EAMR head.

FIG. 10 is a diagram depicting an exemplary embodiment of an EAMR head 310'''. FIG. 10 depicts side and overcoat layer views of the EAMR head 310'''. For clarity, FIG. 10 is not to scale. For simplicity not all portions of the EAMR head 310''' are shown. In addition, although the EAMR head 310''' is depicted in the context of particular components other and/or different components may be used. Further, the arrangement of components may vary in different embodiments. The EAMR head 310''' is analogous to the EAMR heads 110/210/210'/210"/310/310'/310" and may be used in the disk drive 100. Thus, similar components of the EAMR head 310''' have analogous labels. The EAMR head 310''' thus includes a substrate 312''' having a substrate leading edge 314''' and a substrate trailing edge 316''', device layer 320''', overcoat layer 330''' including contacts 332''' and laser 340''' that correspond to the substrate 312/312'/312" having the substrate leading edge 314/314'/314" and the substrate trailing edge 316/316'/316", the device layer 320/320'/320", the overcoat layer 330/330'/330" including contacts 332/332'/332" and the laser 340/340'/340", respectively. Also shown are additional contacts 336''', bond pads 342''' and insulating layer 344''' that are analogous to the contacts 336/336'/336", bond pads 342/342'/342" and insulating layer 344/344'/344". The structure and function of the components 312''', 314''', 316''', 320''', 330''', 332''', 334''', 336''', 340''', 342''', and 344''' are analogous to the structure and function of components 312/312'/312", 314/314'/314", 316/316'/316", 320/320'/320", 330/330'/330", 332/332'/332", 334/334'/334", 336/336'/336", 340/340'/340", 342/342'/342", and 344/344'/344", respectively. Although not shown, the head 310''' may include a capping layer analogous to the capping layers 150 and 250.

The heat spreader 360''' is analogous to the heat spreaders 360 and 360'. More specifically, the heat spreader 360" is analogous to the heat spreaders 360 and 360' in that the heat spreader 360" has a high thermal conductivity and is used to spread heat across the substrate 312. However, the heat spreader 360''' is electrically insulating. Thus, the heat spreader 360''' allows the contacts 332" to be electrically insulated from each other. The heat spreader 360''' is incorporated into the overcoat layer 330". However, in other embodiments, the heat spreader 360''' might be incorporated into the substrate 312''' in an analogous manner to the heat spreader 360, 360' and/or 360".

The EAMR head 310''' functions in an analogous manner to the EAMR heads 110/210/210'/210"/310/310'/310". Thus, the thermal management of the EAMR head 310''' and the EAMR disk drive 100 in which it may be used may be improved through the use of the contacts 332". Thus, the EAMR head 310" may be better able to manage heat without complicating fabrication or occupying substantially more of the overcoat layer 330'. Further, the head 310''' includes heat spreader 360'''. The heat spreader 360" may further conduct heat from the laser 340''' across the substrate 312'''. In embodiments in which the heat spreader 360''' occupies a portion of the ABS or is only slightly recessed from the ABS, the heat spreader 360''' also conducts heat to the ABS. The ABS may provide an improve mechanism for dissipation of the heat from the laser 340'''. In addition, as the heat spreader 360''' is incorporated into or as the overcoat layer 330''', a separate heat spreader need not be provided. Further, in some embodiments, the contacts 332''' need not extend to the substrate 312''' if heat may be sufficiently dissipated through the heat spreader 360'''/overcoat layer 330'''. Fabrication of the head 310''' may be simplified. Thus, thermal management of the EAMR head 310''' may be further improved. Performance and reliability of the EAMR head 310''' may thus be enhanced.

Thus, the EAMR heads 110, 210, 210', 210", 310, 310', 310", and 310''' may have improved thermal properties. Although specific features have been depicted and described in each of the heads 110, 210, 210', 210", 310, 310', 310", and 310''', specific features of the heads 110, 210, 210', 210", 310, 310', 310", and 310''' may be selected and combined with other features of the same or other heads 110, 210, 210', 210", 310, 310', 310", 310''', and/or other heads that are not shown. For example, the heat spreader 360' and/or 360''' may be incorporated into the head 210. Thus, the thermal management of EAMR heads 110, 210, 210', 210", 310, 310', 310", and 310''' may be improved.

Figure 11:
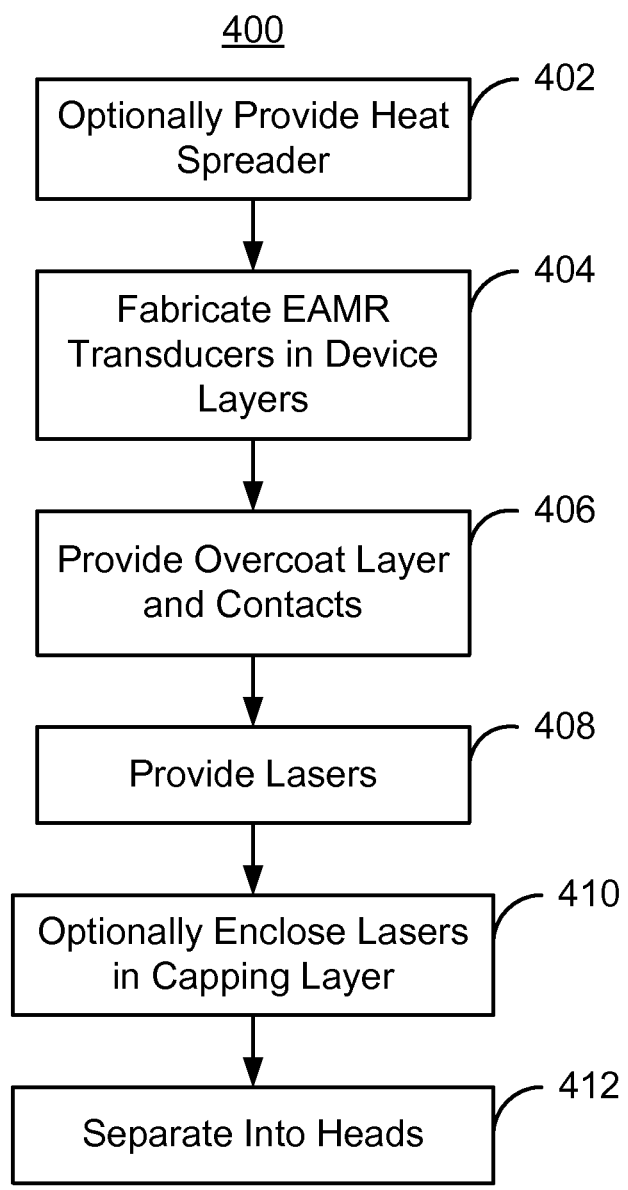
FIG. 11 is a flow chart depicting an exemplary embodiment of a method for fabricating an EAMR head.

FIG. 11 is a flow chart depicting an exemplary embodiment of a method for fabricating an EAMR head. Although certain steps are shown, some steps may be omitted, interleaved, performed in another order, and/or combined. The method 400 is described in the context of the EAMR head 110.

However, the method 400 may be used with other EAMR heads including but not limited to the EAMR heads 210, 210', 210", 310, 310', 310", and/or 310'". The head 110 is fabricated on a substrate 112 that has a front face that corresponds to the substrate trailing edge 114.

A heat spreader 160 is optionally provided, via step 402. If the heat spreader 160 is analogous to the heat spreader 360, 360', or 360", step 402 may be performed prior to fabrication of the EAMR transducer and other components in the device layer 120. However, if the heat spreader 160 is analogous to the heat spreader 360'", then step 402 may be performed later. If no heat spreader is used, then step 402 is omitted.

The EAMR transducer is fabricated in a device layer 120 for each of the plurality of EAMR heads on front face of the substrate 112, via step 404. Step 404 includes providing optical components, such as grating(s), waveguide(s), and near-field transducer(s) for each of the heads 110 being formed. In addition, magnetic components such as shield(s), pole(s), coil(s), and read sensor(s) may also be fabricated.

An overcoat layer 130 is provided on the device layer, via step 406. The overcoat layer 130 includes contacts 332 that extend through the device layer 120. In some embodiments, therefore, step 406 includes forming vias in the overcoat layer 130 and the device layer 120 and filling the vias with the appropriate material(s). However, as discussed above, the contacts 132 may include insulating layers, such as the layer 234, therein. Consequently, the portions of the contacts 132 in the device layer 120 may be formed as part of step 404. For example, vias corresponding to the contacts 132 may be formed in the device layer 120. The vias are filled with thermally conductive material at least up to the insulating layer, such as the insulating layer 234. The thermally conductive material may also be electrically conductive. Thus, insulating layers would then be provided at the desired level in the device layer 120. If an electrically insulating material is used, then the electrically insulating/thermally conducting material may be provided up to the top of the insulating layer 234. Electrically and thermally conductive material may then fill the remaining portion of the vias in the device layer 120. These activities may be performed as part of step 404.

Step 406 may then include forming vias in the overcoat layer 130 and filling these vias with thermally and electrically conductive materials. Further, as discussed above, step 406 may include configuring the contacts such that they occupy a larger portion of the footprint of the laser 140. For example, the contacts 232' may be fabricated in step 406. In addition, if an insulating heat spreader 360'" is used, step 406 may include fabricating the heat spreader 360".

At least one laser is provided for each of the EAMR heads 110 being fabricated, via step 408. Step 408 may include bonding the laser 140 to the overcoat layer 130, for example using bond pads such as bond pads 242. Thus, the laser 140 is thermally, electrically, mechanically coupled with the EAMR head 110.

The laser 140 is optionally enclosed in the capping layer 150, via step 410. Thus, the laser 140 may be provided in the cavity 152. The capping layer 150 may be bonded to the overcoat layer 130.

The substrate 112 is separated into the EAMR heads, via step 412. For example, the substrate 112 may be diced, The EAMR heads 110 may also be lapped to expose the ABS. Thus, the EAMR heads 110 may be fabricated. The EAMR heads 210, 210', 210", 310, 310', 310'" may be fabricated in an analogous manner. Consequently, the benefits of the EAMR heads 110, 210, 210', 210", 310, 310', 310", 310'" may be achieved.

Figure 12:
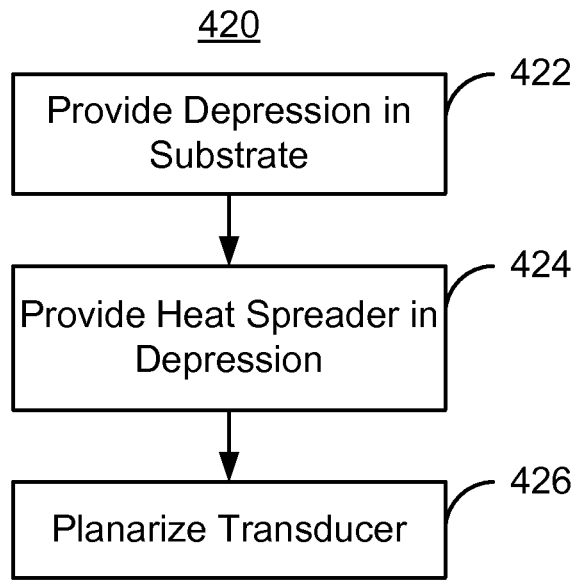
FIG. 12 is a flow chart depicting an exemplary embodiment of a method for fabricating a heat spreader in an EAMR head.

FIG. 12 is a flow chart depicting an exemplary embodiment of a method 420 for fabricating an EAMR head. In particular, the method 420 may be used in providing a heat spreader 160, 360, 360' and/or 360". Although certain steps are shown, some steps may be omitted, interleaved, performed in another order, and/or combined. The method 420 is described in the context of the EAMR head 310. However, the method 420 may be used with other EAMR heads including but not limited to the EAMR heads 110, 210, 210', 210", 310', 310", and/or 310'".

A depression is formed in the substrate 312, via step 422. For the heat spreader 360, the depression formed includes bars. However, for different configurations of the heat spreader, the depression formed may have other shapes. For example, for the heat spreader 360', the depression may be a rectangular slab.

A thermally conductive material is provided, via step 424. In some embodiments, the thermally conductive material is deposited only in the depression. However, in other embodiments, the thermally conductive material may be deposited outside of the depression. For example, a full film deposition may be performed in step 424.

The transducer may then be planarized, via step 426. For example, a chemical mechanical planarization (CMP) may be performed. Thus, the thermally conductive material within the depression is exposed. Thus, the heat spreader 360 or 360' having the desired configuration may be provided. Consequently, the EAMR heads 110, 210, 210', 210", 310, 310', and/or 310" may have improved thermal management.

Figure 13:
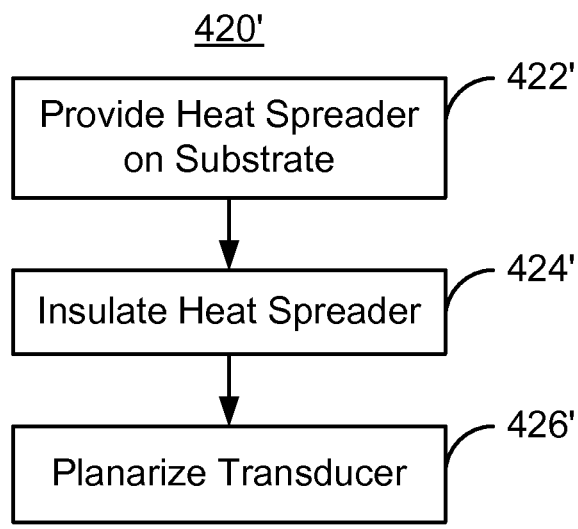
FIG. 13 is a flow chart depicting an exemplary embodiment of a method for fabricating a heat spreader in an EAMR head.

FIG. 13 is a flow chart depicting an exemplary embodiment of a method 420' for fabricating an EAMR head. In particular, the method 420' may be used in providing a heat spreader 360'". Although certain steps are shown, some steps may be omitted, interleaved, performed in another order, and/or combined. The method 420 is described in the context of the EAMR head 310". However, the method 420 may be used with other EAMR heads including but not limited to the EAMR heads 110, 210, 210', 210", 310, 310', and/or 310'".

A thermally conductive material is provided on the substrate in the desired configuration, via step 422'. Step 422' may include depositing a full film, masking a portion of the thermally conductive material, and then removing the exposed portion of the thermally conductive material. In another embodiment, step 422' may include providing a mask on the substrate 312". The mask exposes the portion of the substrate 312" on which the heat spreader 360" is to reside. The thermally conductive material is then deposited on the exposed portion of the substrate 312". Thus, the desired shape of the heat spreader 360" is fabricated.

An insulating material is then deposited, via step 424'. The thermally conductive material provided in step 422' may also be electrically conductive. The remainder of the layer is desired to be electrically insulating. Consequently, the insulating material is provided.

The transducer may then be planarized, via step 426'. For example, a CMP may be performed. Thus, the thermally conductive material is exposed. Thus, the heat spreader 360" surrounded by insulating material 362 may be provided. Consequently, the EAMR heads 110, 210, 210', 210", 310, 310', and/or 310" may have improved thermal management.

Using the methods 400, 420, and 420', the desired EAMR heads 110, 210, 210', 210", 310, 310', 310", and/or 310'" may be fabricated. Thus, EAMR heads 110, 210, 210', 210", 310, 310', 310", and/or 310'" having improved thermal properties may be provided.

We claim:

1. An energy assisted magnetic recording (EAMR) head comprising:
    a substrate including a leading edge and a substrate trailing edge;
    at least one EAMR transducer residing in a device layer and on the substrate trailing edge;
    an overcoat layer including a plurality of contacts, the device layer residing between the overcoat layer and the substrate trailing edge;
    at least one laser for providing energy to the EAMR transducer, the overcoat layer residing between the substrate trailing edge and the at least one laser, the at least one laser being electrically coupled to at least a first portion of the plurality of contacts, the plurality of contacts providing thermal connection through the overcoat layer and through the device layer to the substrate, at least a second portion of the plurality of contact being electrically insulated from the substrate.

2. The EAMR head of claim 1 wherein the overcoat layer further includes at least one additional contact, the at least one laser being electrically insulated from the at least one additional contact.

3. The EAMR head of claim 1 wherein the at least one laser has a laser footprint on the overcoat layer, and wherein the plurality of contacts extends at least across the laser footprint in a first direction and are separated by a distance in a second direction, the distance being such that each of the plurality of electrical contacts is electrically isolated from any other electrical contact in the overcoat layer.

4. The EAMR head of claim 3 wherein the distance is a minimum separation such that each of the plurality of electrical contacts is electrically isolated from any other electrical contact in the overcoat layer.

5. The EAMR head of claim 1 further comprising:
    a plurality of laser bond pads for electrically connecting the at least one laser with the plurality of contacts and mechanically coupling the at least one laser with the overcoat layer.

6. The EAMR head of claim 1 wherein each of the second portion of the plurality of contacts includes an insulating layer therein, the insulating layer allowing thermal connection through the device layer and electrical connection to a portion of the device layer.

7. The EAMR head of claim 1 further comprising:
    a capping layer enclosing the at least one laser.

8. The EAMR head of claim 1 further comprising:
    a heat spreader adjacent to a portion of the substrate, the heat spreader thermally connected with at least a third portion of the plurality of contacts.

9. The EAMR head of claim 8 wherein the EAMR head includes an air-bearing surface (ABS) and wherein a portion of the heat spreader occupies a portion of the ABS.

10. The EAMR head of claim 8 wherein the heat spreader includes a thermally conductive slab.

11. The EAMR head of claim 8 wherein the heat spreader includes a plurality of thermally conductive bars.

12. The EAMR head of claim 1 wherein the overcoat layer further includes:
    an electrically insulating heat spreader thermally connected with the plurality of contacts and electrically insulating the plurality of contacts.

13. The EAMR head of claim 1 wherein the plurality of contacts includes at least one of Cu, Ag, and Au.

14. An energy assisted magnetic recording (EAMR) disk drive comprising:
    a media for storing data; and
    a slider including a substrate, a device layer, at least one EAMR transducer residing in the device layer, and an overcoat layer, the substrate including a leading edge and a substrate trailing edge, the device layer residing on the substrate trailing edge, the overcoat layer including a plurality of contacts, the device layer residing between the overcoat layer and the substrate trailing edge, the plurality of contacts providing thermal connection through the overcoat layer and through the device layer to the substrate; and
    at least one laser for providing energy to the EAMR transducer, the overcoat layer residing between the substrate trailing edge and the at least one laser, the at least one laser being electrically coupled to at least a first portion of the plurality of contacts, at least a second portion of the plurality of contact being electrically insulated from the substrate.

15. The EAMR head of claim 8 wherein the third portion of the plurality of contacts provide thermal connection to an air-bearing surface including a portion of the substrate through the heat spreader.

16. The EAMR disk drive of claim 14 wherein the slider further includes:
    a heat spreader adjacent to a portion of the substrate, the heat spreader thermally connected with at least a third portion of the plurality of contacts, the third portion of the plurality of contacts providing thermal connection to an air-bearing surface including a portion of the substrate through the head spreader.

* * * * *